H. SINDING-LARSEN.
STIRRING APPARATUS.
APPLICATION FILED APR. 26, 1915.

1,200,250.

Patented Oct. 3, 1916.
2 SHEETS—SHEET 1.

Inventor
Holger Sinding-Larsen.

UNITED STATES PATENT OFFICE.

HOLGER SINDING-LARSEN, OF CHRISTIANIA, NORWAY.

STIRRING APPARATUS.

1,200,250.  Specification of Letters Patent.  Patented Oct. 3, 1916.

Application filed April 26, 1915. Serial No. 23,911.

*To all whom it may concern:*

Be it known that I, HOLGER SINDING-LARSEN, a subject of the King of Norway, residing at Christiania, Norway, have invented certain new and useful Improvements in Stirring Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in stirring apparatus for dough or the like and particularly to that kind of stirring apparatus, which are provided with scrapers for preventing the dough or farce from sticking to the bottom and sides of the stirring trough in order to bring all the parts of the material to be stirred under the influence of the stirring mechanism.

The object of the invention is to provide scrapers of the kind referred to which on passing through the dough or the like will be pressed closely against the sides and bottom of the stirring trough with an adjustable pressure so that unnecessary wear of the scrapers is avoided. In order to obtain this effect the scrapers according to the present invention are pivotally mounted on axes, parallel to the surface to be acted upon by the scrapers, and the scrapers are so formed, that while the part of the scraper which lies between the axis and the scraping surface is acted upon by the dough so as to press the edge of the scraper against its scraping surface, the part of the scraper on the opposite side of the axis is acted upon by the dough so as to counterbalance the first named pressure. By altering the form of the latter part of the scraper the pressure of the scraping edge against the scraping surface may be regulated.

Figure 1:
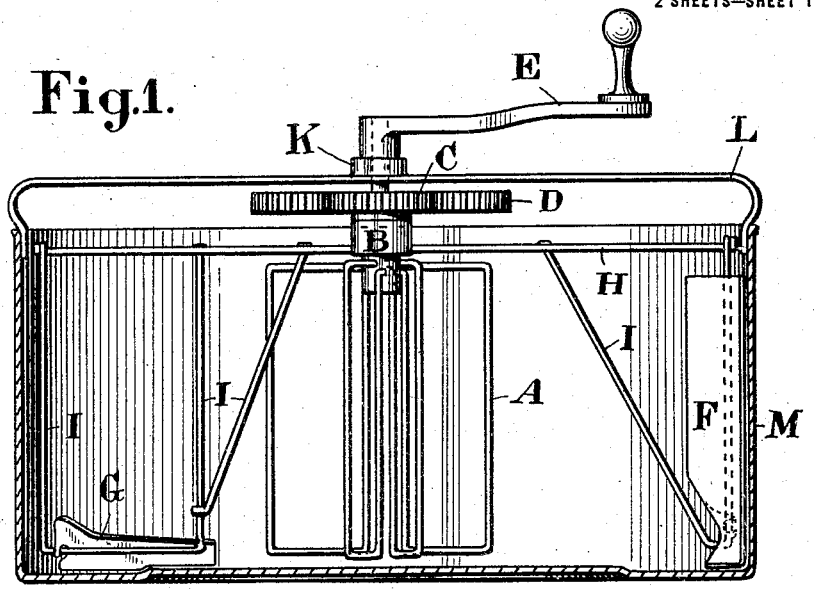
Figure 2:
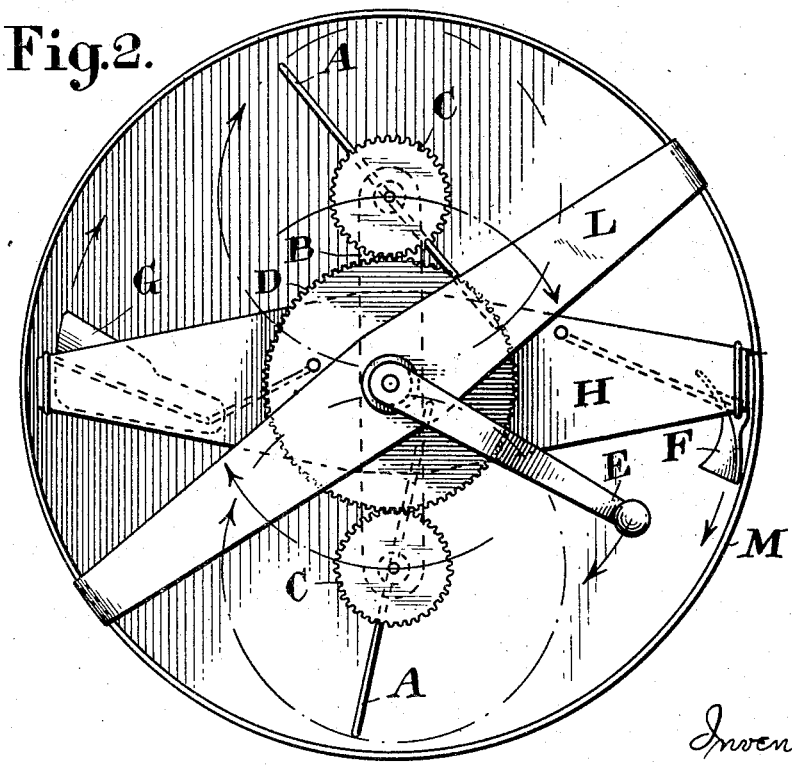
Figure 3:
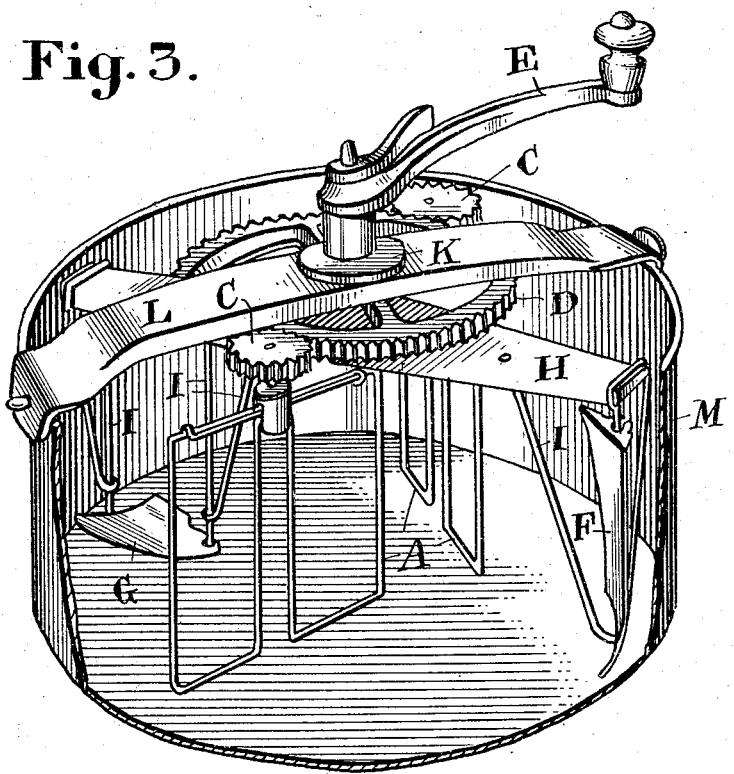

In the drawings: Figure 1 is a sectional view through a stirring apparatus constructed in accordance with the present invention. Fig. 2 is a plan of the same apparatus. Fig. 3 is a perspective view of the stirring apparatus, part of the stirring trough being cut away to show the interior mechanism.

The stirring apparatus illustrated comprises a stirring mechanism consisting of two wire loops or squares A which are rotatably mounted at opposite ends of an arm B. Said arm is rotatably mounted in a vertical bearing K on a cross bar L connected to both sides of the stirring trough M. The arm B can be rotated by means of crank E. A stationary toothed wheel D is mounted co-axially with the journal of arm B and this toothed wheel is in mesh with pinions C on the shafts of loops A. This stirring mechanism forms no part of the present invention and further description of the same is therefore not thought necessary.

To the arm B is fastened a cross piece H, which takes part in the rotation of the stirring mechanism. On the free ends of said cross piece H are mounted steel wire attachments I projecting downwardly from the said cross piece. One of said attachments essentially comprises a part parallel to the side wall of the stirring trough M, and the other attachment essentially comprises a part parallel to the bottom of the stirring trough. On the said parts of the steel wire attachments are mounted the scrapers F, G for the side wall and the bottom of the trough respectively. The said scrapers may be formed of pressed sheet metal but it is preferred to form the scrapers of pressed celluloid, hardwood or the like and they are provided with suitably bent parts, which as shown on the drawings may be formed as claws gripping the steel wire attachments so as to secure a rotatable mounting of the scrapers on the respective parts of the steel wire attachments I. The scrapers having an angular position with relation to their respective scraping surfaces the dough or the like pressing against the scraper between the scraping edge and the axis will act to press the same against its scraping surface, while the dough acting on the rest of the scraper viz. the part behind the axis will counteract the first named pressure and thus lessen the pressure of the scraping edge against the scraping surface. Owing to the claw-like connection between the scrapers and their steel wire attachments, the scrapers may easily be removed for cleaning purposes.

Although the invention has here been described in connection with a stirring apparatus for dough or the like it will easily be understood that it may be applied on any kind of stirring apparatus where it is desired to use scrapers in connection with a stirring mechanism.

Claims.

1. In a stirring apparatus the combination with a stirring mechanism for agitating dough or the like in a stirring trough of scrapers for removing the dough or the like from the walls and bottom of the stirring trough, said scrapers being pivotally mounted on axes between and parallel to their respective scraping surfaces, whereby the dough or the like agitated by the scraper will act upon the part of the scraper between the scraping surface and the axis of the scraper to press the scraping edge against the scraping surface, while it will act on the part of the scraper behind the axes of the same, to counterbalance the first named pressure.

2. In a stirring apparatus, a rotating stirring mechanism, scrapers connected to and revolving with the said stirring mechanism, said scrapers being mounted to swing about a line parallel to their respective scraping surfaces between the front and back edges of the same, in order to obtain a counterbalancing effect by the pressure of the dough on the surface of the scraper in front of and behind its axis.

3. A stirring apparatus comprising a receptacle, and a counterbalanced scraper revoluble therein and arranged to engage the wall thereof, for the purpose specified.

4. A stirring apparatus comprising a receptacle, and a revoluble scraper pivotally mounted therein having one edge arranged to contact with the wall of the receptacle and a counterbalancing portion operating to reduce the pressure of the contacting edge on the wall of the receptacle.

5. A stirring apparatus comprising a receptacle, scrapers for engaging the walls of the receptacle pivotally mounted between their edges on axes parallel to said walls, whereby the material in the receptacle will equalize the pressure on both edges of the scrapers.

6. A stirring apparatus, comprising a receptacle, scrapers for engaging the walls of the receptacle revolubly mounted therein and centrally pivoted on axes parallel to the walls of the receptacle, said scrapers being curved eccentrically to said walls, the material in the receptacle operating on the rear portions of the scrapers to counterbalance the pressure on the front portions thereof.

In testimony that I claim the foregoing as my invention, I have signed my name in presence of two subscribing witnesses.

HOLGER SINDING-LARSEN.

Witnesses:
M. E. GUTTORENSEN,
C. F. HANSEN.